United States Patent [19]
Monahan, Jr.

[11] Patent Number: 5,379,579
[45] Date of Patent: Jan. 10, 1995

[54] METHOD FOR HARVESTING BROOM CORN AND APPARATUS THEREFOR

[75] Inventor: Thomas F. Monahan, Jr., Arcola, Ill.

[73] Assignee: The Thomas Monahan Company, Arcola, Ill.

[21] Appl. No.: 108,114

[22] Filed: Aug. 17, 1993

[51] Int. Cl.6 ............................................ A01D 45/02
[52] U.S. Cl. ................................... 56/54; 56/121.46
[58] Field of Search ...................... 56/54, 121.46, 126, 56/55; 460/149

[56] References Cited

U.S. PATENT DOCUMENTS

| | | | |
|---|---|---|---|
| 1,149,281 | 8/1915 | Pallady | 56/54 X |
| 2,699,030 | 1/1955 | Adamson | 56/54 |
| 3,508,557 | 4/1970 | Sunday | 56/54 |
| 4,884,391 | 12/1989 | Cosson | 56/53 |

Primary Examiner—Terry Lee Melius
Attorney, Agent, or Firm—R. William Graham

[57] ABSTRACT

The disclosure relates to improvements in apparatus and method for harvesting and baling broom corn. The harvesting operations include removing the boot leaves, stalk, knuckle, stem and seed from the broom corn while wet, drying the fibers sufficiently, while retaining original coloration and flexibility to allow for the fibers ready implementation into a broom.

13 Claims, 2 Drawing Sheets

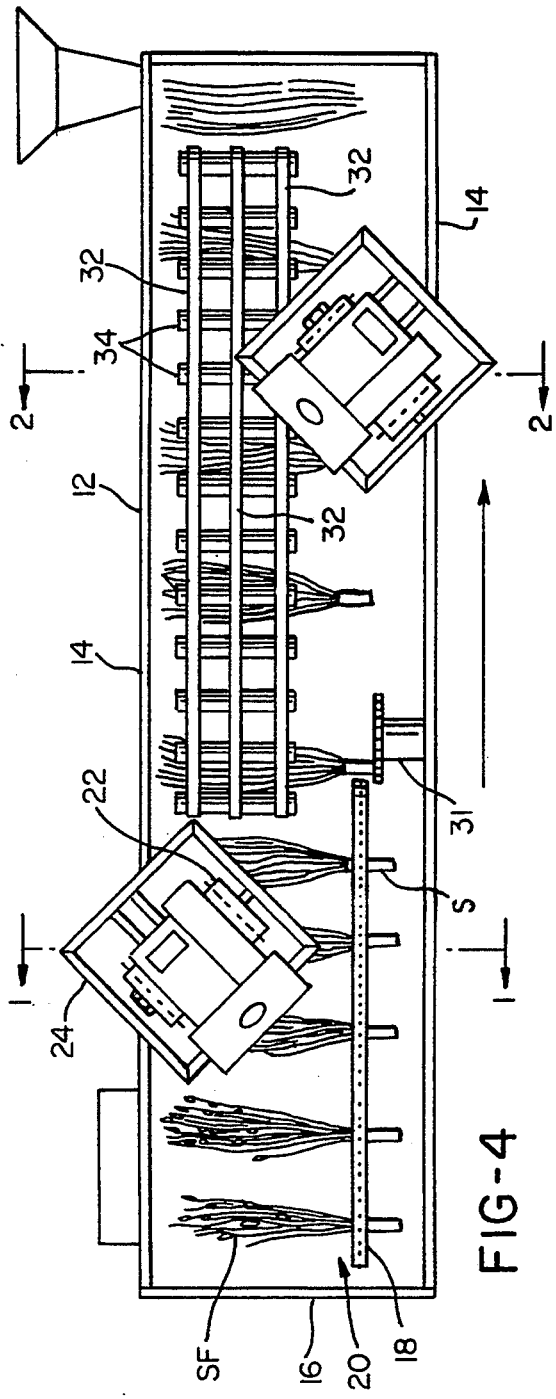
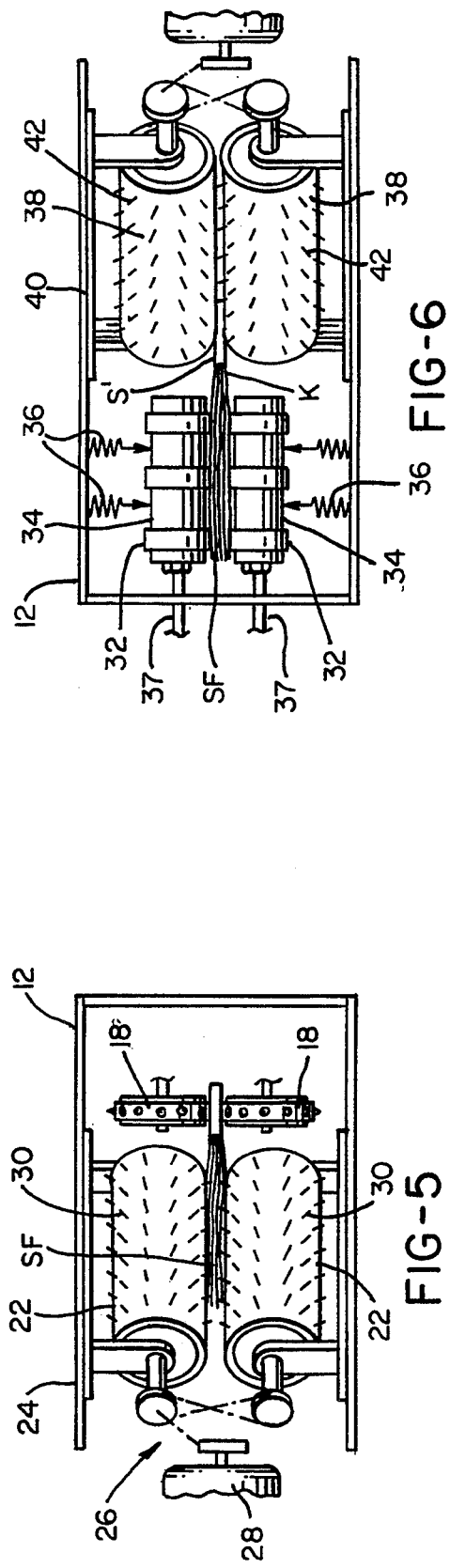

METHOD FOR HARVESTING BROOM CORN AND APPARATUS THEREFOR

FIELD OF INVENTION

This invention relates to the harvesting of broom corn and to the preparing of the broom corn for baling and shipment to the factory.

BACKGROUND OF THE INVENTION

Broom corn is an annual plant which grows in height between approximately three (3) to six (6) feet. Broom corn is comprised of a stalk, stem, knuckle, a plurality of straw fibers extending from the knuckle, seed which grows from the straw fibers, and boot leaves which envelop the straw fibers and seed which connect to a joint at a base of the stem. The straw fibers run in length from approximately 12 inches to 22 inches. These straw fibers become the straw fibers for the manufacture of brooms. Thus, the straw fibers are the commercially valuable portion of the plant.

Presently broom corn is harvested either manually or by machine. For example, a head and flag leaf of a stalk is gripped and pulled in a manner to cause it to break away from at a knuckle of the stalk. The remaining boot leaves, straw fiber, seed, knuckle and stalk, are left to dry. The knuckle portion of the broom corn is usually the last part to dry. The remainder can take from several days to a week to dry depending upon the weather and available drying apparatus available. The fibers tend to discolor as they are left exposed to the elements of weather, which is an undesirable result. While artificial drying techniques have been attempted, however, such techniques prove to dry out the fiber and result in loss of flexibility and durability.

Once the knuckle, seed and fiber are dried they are transported to a location which removes the seed and excess stalk. After the boot leaves are removed, the fibers are then seeded and sorted for color, with green being the most desired. The knuckle and remaining stalk are removed, and the fibers are also sorted for length and waviness. It is preferable that all fiber be green for flexibility and appearance. The fibers are sized individually to lengths of 16, 18, and 20 inches. The fibers are transported to the manufacturing site where they are integrated into the broom.

As labor costs have increased substantially, the industry is looking to other means in reducing the same. In this regard, the present invention attempts to provide broom corn harvesting machinery to aid in the process. Such machines of the present invention aim to be helpful in the initial cutting and bundling of the broom corn and reduce transportation and labor costs associated with the excess stalk, boot leaves and seed as presently harvested.

Summary of the Invention

An object of the invention is to provide a novel and improved method and apparatus for harvesting the broom corn straw fibers.

Another object of the present invention is to provide a method of harvesting broom corn which allows for the broom corn to be harvested in the fields without the need for substantial sorting of color.

Another object of the present invention is to provide a method of harvesting broom corn which decreases the amount of natural drying time needed for readying the broom corn into production.

It is still another object of the present invention to provide a process for harvesting broom corn in a manner wherein the seed, stem, and knuckle of the broom corn are removed while wet to provide a fiber of increased length and uniformity.

Yet another object of the present invention is to provide a broom corn harvesting process and apparatus which will reduce cost of production while increasing product.

Accordingly, an embodiment of the present invention is directed to a process for harvesting wet broom corn, comprising the steps of holding said broom corn at a position of the stem while gripping a vein of said broom corn to allow for said vein and boot leaves of the broom corn to be torn away from the broom corn; tearing said vein and boot leaves from the broom corn; cutting said broom corn at a point on a stalk of said broom corn to provide a processable remainder of said broom corn which includes a stem attached to a knuckle attached to a seed fiber; holding said remainder of said broom corn at a position of said stem while deseeding seed fiber; holding said fiber while busting out said knuckle and said stem to provide a resultant fiber with an increased length, said fiber owing part of their length to a portion of said knuckle and said stem; and drying said resultant fiber in a manner to remove a sufficient amount of water without substantially effecting the coloration, flexibility and grade of the fiber.

Another embodiment of the present invention is directed to an apparatus for harvesting wet broom corn which has been cut at a point of a stalk and had a vein and boot leaves of the broom corn removed therefrom to provide a processable remainder including a stem connected to a knuckle connected to seed fibers, comprising: a first conveyor gripping means adapted to grip said stem and convey the remainder along a first section of a longitudinally disposed path wherein said seed fibers are oriented substantially transversely to the path; means in said first section of said path for deseeding the fiber as it passes thereby; a second gripping means operatively associated with said first gripping means for gripping said fiber and for continuing movement longitudinally along a second section of said path, wherein said stem is oriented substantially transversely to the path; and means in said second section of said path and laterally spaced from said seeding means for busting out said knuckle and said stem as it passes thereby.

BRIEF DESCRIPTION OF THE DRAWINGS

FIG. 4 is a plan view of the apparatus of the present invention.

FIG. 5 is an enlarged transverse elevational view of a section taken along line 1—1 at FIG. 4, to show the rollers with the broom corn plant being held between the gripping belts as seeds and boot leaves are removed from the plant.

FIG. 6 is an enlarged transverse elevational view of a section taken along line 2—2 at FIG. 4, to show the rolls with the broom corn plant being held between the gripping belts as it is being deknuckled.

DETAILED DESCRIPTION OF PREFERRED EMBODIMENT

Figure 1:
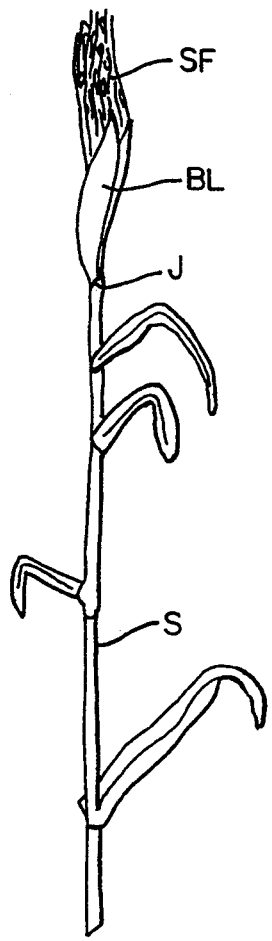
FIG. 1 shows a broom corn plant at a stage suitable for harvesting.
Figure 2:
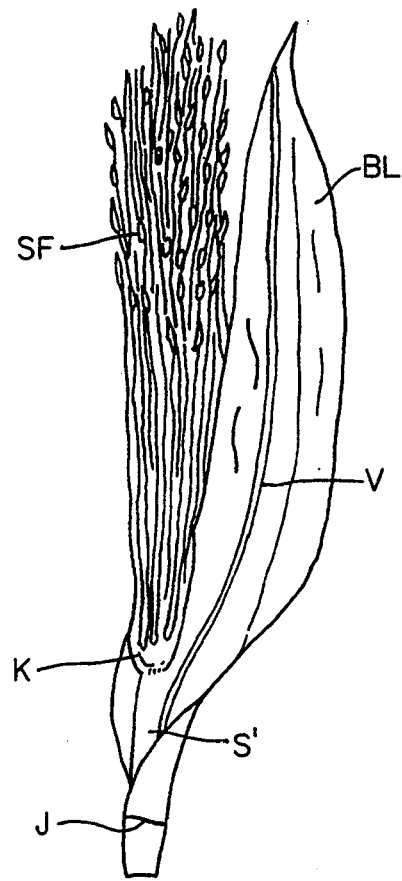
FIG. 2 is an enlarged view of the head of the broom corn.

A broom corn plant is shown in an upright position in FIGS. 1 and 2. The broom corn has a stalk S seed fiber SF at the top thereof and boot leaves BL which is shown pulled away from the seed fiber SF in FIG. 2, but normally encompasses the seed fiber SF through the harvesting period. A stem S' of the broom corn is joined at a joint J a few inches below the knuckle K at the top of the stem S'. The boot leaves BL are connected to the joint J and will not drop away from the seed fiber SF until the plant is fully mature. The seed fiber SF must be harvested prior to the plant fully maturing, as the seed fiber SF is no longer desirable for use as good broom straw fiber at this point in time.

As previously stated, it is desirable to harvest shortly before maturity when the boot leaves BL still embrace the seed fiber SF. The boot leaves BL, however, are a comparatively tough growth to the fibers and include a vein V with a blade of the boot leaves BL extending from each side of this vein V to embrace the seed fiber SF. While the plant is wet, it is desirable to remove the seed from the seed fiber SF, bust out the knuckle K from the seed fiber SF and to remove the stem S'. This is desirable and necessary because the factories which use the baled product for broom manufacture cannot economically remove the boot leaves BL, seed, knuckle K and stem S'. A bale of broom corn including substantially only green straw fibers which are free of boot leaves BL, seed, knuckle K and stem S' will bring a substantially higher price than will a bale having varying color without the boot leaves BL, seed, stems and knuckle K removed.

Prior to the present invention, the knuckle K and stem S' remained intact with the seed fiber SF until dry, because there was no adequate means for busting out the wet knuckle K and stem S'. This presented a problem because the integrity, quality and color of the straw fibers is highest while the plant is wet. Referring to FIG. 2, the desired remaining portion of the broom corn is shown with the boot leaves BL pulled back to expose the seed fiber SF. Vein V runs down the center of the boot leaves BL and connects to the joint J at the base of the stem S'.

While it has previously been the case that the boot leaves BL be substantially dried to remove them from the plant, it has been discovered in the present invention that by removing vein V, this thereby allows easier removal of the boot leaves BL without substantial difficulty. This is likewise carried out by the present invention with the aid of machine or hand.

Unlike the prior harvesting techniques, the present invention employs a novel and unique method and apparatus for harvesting broom corn. The broom corn is cut at the stalk S as high as possible but below the stem S' either by hand or conventional harvesting machinery. The broom corn is then bundled and transported to to be run through the machinery hereinafter described.

Figure 3:
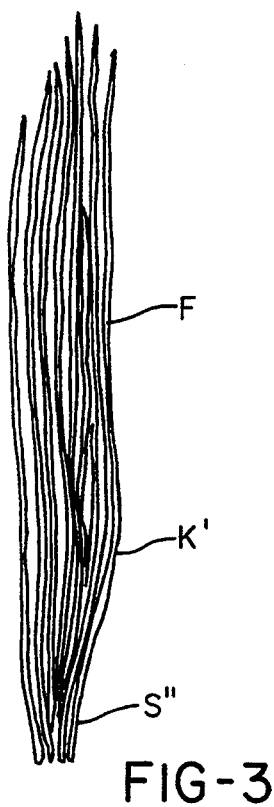
FIG. 3 is an enlarged view of processed broom corn straw fiber of the present invention.

While the plant is still wet, the boot leaf BF is removed, and the seed fiber SF, knuckle K, and stem S' are further processed. The seed is removed from the fibers and the broom corn is tipped or cut to a predetermined length, preferably twenty-four (24) inches. Subsequently, the knuckle K is busted or ripped out of the plant so that individual fibers have part of the knuckle K and stem S' attached to one end. As shown in FIG. 3, the processed fibers F has knuckle portion K' and stem portion S" thereon. By virtue of this step, additional length is added to each of the fibers F as it gains part of its length from the knuckle portion K' and stem portion S".

While the knuckle K can be laboriously busted out by hand, the apparatus of the present invention provides a easy and efficient means for performing this step. This is a particularly advantageous step in the harvesting process in that it allows the product to naturally dry in a relatively short period of time, i.e. within three to six hours without the aid of machine. The excess knuckle K and stem S' are discarded which reduces the amount of waste transported to broom manufacturing sites. Approximately 30 to 40% less weight is transported to the end processor and does away with the need for sorting.

The apparatus which receives the broom corn, may be formed as a single elongated machine arranged in a manner illustrated in FIG. 4. This apparatus is supported by suitable framework 12 having longitudinal, horizontal members 14 interconnected by transverse and vertical members 16 at predetermined spaced positions. The framework 12 is partially represented in the drawings, as it may be designed with various modifications or derivations thereof.

The seed fibers SF are moved through the framework 12 along a longitudinal path defined by opposing conveyor tooth type belts 18 which holds the stem portion of the plant crosswise and horizontally. As the plant is conveyed from a receiving point 20, diagonally positioned rollers 22 held within framework 24, which are oriented one above the other and above and below the belts' 18 contact level and at an inclination with respect to belts 18 and of a size to receive the seed fiber SF of the plant therebetween and remove seed from one end of the fiber F to the other, see FIG. 5. Drive mechanisms 26 extend from a motor 28 and connect to the rollers 22. The rollers 22 are rotatably connected to the framework 24 and preferably set at about 30° to parallel of belts 18 and at a rate which is correlated to the rate of movement of the broom corn on the conveyor belts 18. The speed of the cylinder is from about 400 rpm to 700 rpm per second, with 650 rpm found to be highly suitable for most types of broom corn. The belt speed is from one foot per second to two feet per second. It is noted that other angle of attack and speeds of operation for the apparatus may be desirable for other types of broom corn. The rollers 22 include a plurality of radially extending teeth 30 which are spaced and adapted to comb through the seed fiber SF as the rollers 22 rotate. This combing removes the seed from the fiber and any extraneous matter adhered thereto. Again, other combinations of speed, angle and number of teeth may achieve this result, with the aforesaid having been found suitable.

A saw 31 is adjustably mounted to the frame 12 at a point down line from the seeding operation adjacent a terminal point of the belts 18. The saw 31 positioned to cut off a portion the stalk S to cause uniform sizing of the remaining broom corn plant.

As the remaining broom corn exits the tooth belts 18, a set of conveyor gripping belts 32 grip and hold the seeded fibers with sufficient force to hold the plant in place during the busting out of the knuckle K and stem S'. In this regard, a plurality if cylinders 34 are movably disposed within the belts 32 and biased using springs 36, for example, which are operably interconnecting framework 12 and cylinders 34. The cylinders 34 are rotatably operatively connected to the framework 12 by members 37. The busting out of the knuckle K is achieved through another pair of cylindrical rollers 38 rotatably operably held within framework 40, which are oriented one above the other and above and below the gripping belts 32 contact level and at an inclination of between 0° and 30°, and preferably 18°, to parallel with respect to the adjacent gripping belts 32. Likewise, the cylindrical rollers 38 are motor driven to rotate at a rate which is correlated to the rate of movement of the broom corn fibers on the conveyor gripping belts 32. The rate of movement of the broom corn at this stage is at 1 to 2 ft/sec, and preferably 1.66 ft/sec. For most broom corn, the rollers 38 rotate at a speed of approximately 650 rpm. The cylindrical rollers 38 include radially extending overlapping teeth 42 which are used to rip out the knuckle K and the Stem S'. The diameter of rollers 38 used in the present invention are from 8" to 12" with of a size from about 2"–4" teeth. It is contemplated, however, that the number and diameter of the rollers can be varied to achieve the desired result.

The process and apparatus of the present invention, wherein the rollers 38 and teeth 42 are spaced and angled, allows ripping of the knuckle K and stem S' as the broom corn passes therebetween and in a manner such that the ripping out of the knuckle K is gradual from the knuckle K through the stem S'. Also, as the rollers 38 are positioned more towards parallel with the belts 32, this enables the teeth 42 to cut the plant lengthwise at the stem S' and knuckle K with minimal damage to the plant. Thus, the invention produces a broom corn fiber with increased length, and enables quicker drying time to provide for increased strength and improved color and grade of product.

As an example of an operation using the present invention, a 100 pound load of freshly cut broom corn using the present invention yielded approximately 18% of usable product of a higher grade with 100% green color. The same amount of load using previously employed harvesting techniques yielded 12% usable product of varying colors and grades. In addition, it was estimated that 40 pounds of the load did not need to be transported or processed thereby reducing labor costs in using the present invention doing away with transportation of waste and the need for sorting by color.

Having described the preferred embodiment of the invention above, it is obvious that others in the art can build and devise alternative and equivalent constructions which are within the spirit and scope of this invention. Accordingly, this invention should be entitled to protection of obvious modifications, derivations and improvements thereof.

What is claimed:

1. A process for harvesting wet broom corn, comprising the steps of:
   (a) holding said broom corn at a position of the stem while gripping a vein of said broom corn to allow for said vein and boot leaves of the broom corn to be torn away from the broom corn;
   (b) tearing said vein and boot leaves from the broom corn;
   (c) cutting said broom corn at a point on a stalk of said broom corn to provide a processable remainder of said broom corn which includes a stem attached to a knuckle attached to a seed fiber;
   (d) holding said remainder of said broom corn at a position of said stem while deseeding seed fiber;
   (e) holding said fiber while busting out said knuckle and said stem to provide a resultant fiber with an increased length, said fiber owing part of their length to a portion of said knuckle and said stem; and
   (f) drying said resultant fiber in a manner to remove a sufficient amount of water without substantially effecting the coloration, flexibility and grade of the fiber.

2. The process of claim 1, wherein the step of drying is further characterized by naturally drying the broom corn in the field subsequent to step (a).

3. The process of claim 1, wherein the step of cutting is performed prior to step (a).

4. The process of claim 1, wherein the step (c) is further characterized such that the vein is removed prior to the boot leaf, by seeding the fiber, and busting out the knuckle from a butt end of the plant down.

5. An apparatus for harvesting wet broom corn which has been cut at a point of a stalk and had a vein and boot leaves of the broom corn removed therefrom to provide a processable remainder including a stem connected to a knuckle connected to seed fibers, comprising:
   a first conveyor gripping means adapted to grip said stem and convey the remainder along a first section of a longitudinally disposed path wherein said seed fibers are oriented substantially transversely to said path;
   means in said first section of said path for deseeding the fiber as it passes thereby;
   a second conveyor gripping means operatively associated with said first gripping means for gripping said fiber and for conveying movement longitudinally along a second section of said path, wherein said stem is oriented substantially transversely to said path; and
   means in said second section of said path and laterally spaced from said seeding means for busting out said knuckle and said stem as it passes thereby.

6. The apparatus of claim 5, which further includes means for sizing the broom corn interposed in said path and adapted to cut said stem of said broom corn as it exits from said first conveyor gripping means.

7. The apparatus in claim 5, wherein second gripping means includes biasing means for maintaining a predetermined force on said fibers to hold them in place with minimal damage to the fiber.

8. The apparatus of claim 5, wherein said seeding means includes a pair of cylindrical rollers oriented at an incline of approximately 30° or less to said path and having radially extending teeth at spaced positions, and wherein said busting out means includes a pair cylindrical rollers oriented at an incline of approximately 30° or less to said path and having radially extending overlapping teeth at predetermined spacing.

9. The apparatus of claim 5, wherein said busting out means includes a pair of cylindrical rollers oriented at an incline of approximately 30° or less to said path and having radially extending teeth at spaced positions, and wherein said busting out means includes a pair cylindrical rollers oriented at an incline approximately 18° or less to said path and having radially extending overlapping teeth at predetermined spacing.

10. The apparatus of claim 8, wherein said cylindrical rollers operate at from between about 400 and 700 rpm.

11. The apparatus of claim 9, wherein said cylindrical rollers operate at from between about 400 and 700 rpm.

12. The apparatus of claim 8, wherein said cylindrical rollers operate at about 650 rpm.

13. The apparatus of claim 9, wherein said cylindrical rollers operate at about 650 rpm.

* * * * *